UNITED STATES PATENT OFFICE.

ARTHUR SAUER, OF ZWINGENBERG, GERMANY.

PROCESS OF MAKING MODIFIED MILK.

SPECIFICATION forming part of Letters Patent No. 683,501, dated October 1, 1901.

Application filed January 25, 1901. Serial No. 44,746. (No specimens.)

*To all whom it may concern:*

Be it known that I, ARTHUR SAUER, a subject of the Emperor of Germany, residing at Zwingenberg, a. d. B., German Empire, have invented a new and useful Process of Producing a Rich Milk Similar to Mothers' Milk, of which the following is a specification.

The present invention has for its object to produce a rich milk similar to mothers' milk; and the invention consists of a process for producing a milk-preserve affording said rich milk and being capable for storing and exportation without altering its condition. For making the cow-milk from which said preserve is to be prepared similar to mothers' milk it is well known to partially dissolve the caseous contents of said cow-milk by the addition of water, while the fatty contents, on the contrary, are brought to the desired percentage. The most simple method of doing this is to add fresh cream to the milk. This process is technically applied for quite a number of milk preparations for infant-food. However, in places where fresh cream is not available in large quantities instead of cream butter is applied, which is to be had everywhere. Before being worked the butter must be thoroughly purified, which is done by cooking and filtering the said butter. To convert this cooked and filtered butter into the finely-divided state of a cream-like condition—that is, into very small balls of fat—heretofore met with great difficulties in the manufacture, and when the butter fat is not in the form of a cream-like even fluid it is impossible to employ it in the said process as a substitute for fresh cream. Another difficulty was found in producing a homogeneous mixture by stirring the ingredients, as the usual agitating apparatus have completely failed for this purpose. The present invention, however, eliminates these mentioned disadvantages, and I have found that a milk-preserve of a cream-like form of homogeneous and finest consistency is obtained if the mixture is effected in a vacuum apparatus at a temperature of 35° to 40° Celsius. This effect is produced by the bubbles and waves occurring in the vacuum and by maintaining the mentioned temperature. If the latter is increased, the butter fat remains in its melted condition. If decreased, the fat solidifies and prevents emulsion. Therefore the milk-preserve is produced by the following process:

The cow-milk is partially evaporated in a vacuum, sugar and melted butter are added, and then simultaneously with further evaporating at a temperature of 35° to 40° Celsius the ingredients are thoroughly mixed by the bubbles and waves occurring in the vacuum, so that the resulting preserve gets a cream-like form of homogeneous and finest consistency. When mixed in a suitable amount of water, the said cream affords a splendid rich milk similar to mothers' milk and forming an easily-digestible nourishment.

The following example shows clearly the method of working: One thousand liters of milk having a specific gravity of 1.029 and 1.033 and fatty contents of 3.3 to 3.5 per cent. are, with an addition of bicarbonate of soda, placed in a vacuum under a heat of 35° to 40° Celsius and evaporated to about five hundred liters, from which latter about two hundred liters are drawn off. With this last amount forty-five kilograms of cooked filtered butter and one hundred and twenty kilograms of sugar are mixed and stirred and the entire mixture then allowed to be absorbed by the vacuum. After this mass under warmth of 35° to 40° is concentrated to the desired thickness—*i. e.*, four hundred and fifty kilograms—the same, now thoroughly mixed, is passed through sieves into receiving-cans, where thirty grams of bicarbonate of soda dissolved in one liter of water are added. The prepared milk is then sealed in cans and for being sterilized set in boiling water about eighteen minutes. After cooling a fine cream is obtained, which is durable for years and which when mixed in thirteen parts water affords a splendid rich milk similar to mother's milk.

Having now described my invention, what I claim as new, and desire to protect by Letters Patent, is—

A process for producing a rich milk similar to mothers' milk consisting of partially evaporating the milk, adding cooked filtered butter and sugar thereto within a vacuum, then further evaporating the mixture under a heat of 35° to 40° Celsius and finally cooling the obtained very fine and homogeneous milk-preserve affording said rich milk when water is added substantially as described.

ARTHUR SAUER.

Witnesses:
JEAN GRUND,
CARL GRUND.